United States Patent [19]

Tsang et al.

[11] Patent Number: 4,883,023
[45] Date of Patent: Nov. 28, 1989

[54] POLYMERIC MEMBRANE AIR SEPARATOR FOR A TURBOCHARGER AND BRAKE SYSTEM IN A VEHICLE

[75] Inventors: Peter Tsang, Union Lake; Seong Rhee, Northville; Michael Jacko, Southfield, all of Mich.; James Kubik, Avon Lake, Ohio

[73] Assignee: Allied-Signal Inc., Morristown, N.J.

[21] Appl. No.: 284,266

[22] Filed: Dec. 14, 1988

[51] Int. Cl.$^4$ ............................................. F02D 19/00
[52] U.S. Cl. ................................ 123/25 A; 123/25 C; 55/163; 210/321.61
[58] Field of Search ................ 123/25 A, 25 C; 210/321.61; 55/163

[56] References Cited

U.S. PATENT DOCUMENTS

| | | | |
|---|---|---|---|
| 4,406,255 | 9/1983 | Goodman | 123/25 A |
| 4,411,224 | 10/1983 | Goodman | 123/25 A |
| 4,441,476 | 4/1984 | Roberts et al. | 123/25 A |
| 4,558,665 | 12/1985 | Sandberg et al. | 123/25 A |

Primary Examiner—E. Rollins Cross
Attorney, Agent, or Firm—Leo H. McCormick, Jr.; Ken C. Decker

[57] ABSTRACT

In a vehicle having a turbocharger (12) for supplying pressurized air to a combustion chamber in an engine (10) and a storage reservoir (34) for supplying pressurized air as a power source for a brake system (35), a polymeric fiber membrane (46) for separating pressurized air from a compressor (18) into moist oxygen enriched air and dry nitrogen enriched air. The moist oxygen enriched air is added to inlet air of the turbocharger (12) to enhance combustion of fuel in the combustion chamber while the dry nitrogen enriched air is communicated to the storage reservoir (34) to operate the brake system (35) and reduce the possibility of oxidization of components therein.

15 Claims, 2 Drawing Sheets

POLYMERIC MEMBRANE AIR SEPARATOR FOR A TURBOCHARGER AND BRAKE SYSTEM IN A VEHICLE

This invention relates to a polymeric membrane for separating pressurized air into moist oxygen enriched air and dry nitrogen enriched air to respectively enhance the combustion of fuel in an engine and reduce the possibility of oxidization and corrosion of components in a brake system.

Diesel engines of the type used in heavy duty trucks are commonly equipped with turbochargers, which use exhaust gases of the engine in order to compress atmospheric air and charge the intake manifold of the engine with air at above atmospheric pressure to substantially increase the efficiency of the engine. Turbocharged diesel engines are commonly provided with an engine-operated air compressor which compresses atmospheric air for use in, for example, the vehicle air brake system. However, such air may contain a high degree of moisture which requires the need to an air dryer before the pressurized air is supplied to a brake system. U.S. Pat. No. 3,464,186 illustrates a typical dryer system currently used by many vehicles manufacturers. In this type dryer system, pressurized air is presented to a desiccant material where moisture is absorbed to create dry pressurized air. However, after a period of use, the desiccants must be purged to expel the water that has been removed from the pressurized air. While this type of dryer does operate in an acceptable manner, customers are always looking for new, better and less costly components for air operated brake systems for vehicles.

Membrane separators of the type disclosed in U.S. Pat. No. 4,230,463 have been developed for separating hydrogen from other gases. The transportation of fluids or solutes through membranes is driven by a difference in free energy or chemical potential across the membrane. The driving force may be the result of a pressure differential concentration or electrical potential between the fluid phase on the upstream and downstream sides of the membrane. Research and development in reverse osmosis technology has resulted in the development of hollow fiber membranes for use as separators of components in various mixtures.

Basically, a hollow-fiber membrane is a capillary having a diameter of less than 1 mm, and whose wall functions as a semipermeable membrane. The fibers can be employed singly or grouped into a bundle which may contain tens of thousands of fibers. Hollow-fiber membranes, can be divided into two categories: "open" hollow fibers where a gas or liquid permeates across the fiber wall, while flow of the lumen medium gas or liquid is not restricted; and "loaded" fibers where the lumen is filled with an immobilized solid, liquid, or gas.

Hollow-fibers can be prepared from almost any spinnable material. The fiber can be spun directly as a membrane or as a substrate that is post treated to achieve desired membrane characteristics.

The desired fiber-wall morphology frequently dictates the spinning method used to manufacture the membrane. The basic morphologies are isotropic, dense or porous; and anisotropic, having a tight surface (interior or exterior) extending from a highly porous wall structure. Membrane-separation technology is achieved by use of these basic morphologies.

In the present invention, an anisotropic composite hollow-fiber membrane made from a polysulfone polymer of the type disclosed in U.S. Pat. No. 4,323,454 and sold by Permea under the trade name of Prism Cactus ™ was evaluated as an air dryer in a brake system.

This invention was evaluated in a lab having an air compressor of the type used to supply pressurized air to a brake system. In such systems it is common practice to have an air dryer of the type disclosed in U.S. Pat. No. 3,464,186 located downstream from the compressor to remove water before the pressurized air is supplied to the storage reservoir. In accordance with this invention the polymeric hollow-fiber membrane was substituted for desiccant in the air dryer in the prior art system. The membrane separated the pressurized air into a moist oxygen enriched air stream and a dry nitrogen enriched air stream. The moist oxygen enriched stream while flowing to the environment during the initial test, includes structure to present the same to an engine and enhance the combustion of the fuel in an actual installation on a vehicle. The dry nitrogen air stream which was continually communicated to a storage reservoir without the need of rejuvination as is needed with desiccant type materials. In addition, the dry nitrogen enriched air would reduce the possibility of oxidization and corrosion of the components in the brake system.

It is an object of this invention to provide a vehicle with a source of pressurized dry nitrogen enriched air capable of operating a brake while at the same supplying a combustion chamber with moist oxygen enriched air to aid in the combustion of fuel.

It is an object of this invention to provide a vehicle having a turbocharger which supplies pressurized air to a combustion chamber with pressurized moist oxygen enriched air from a membrane separator to enhance the combustion of fuel and reduce the NOx by reducing the peak combustion temperature while dry nitrogen enriched air from the membrane separator is supplied to a storage reservoir for operating a brake system, the dry nitrogen enriched air preventing oxidization and corrosion of the components within the brake system.

An advantage of the invention resides in the continuous presentation of the moist oxygen enriched air to the engine during operation of an air compressor to recover some of the power used to drive the air compressor.

Another advantage of this invention occurs in the operation of the engine wherein the addition of moist oxygen enriched air reduces the combustion temperature while increasing the combustion efficiency and thereby reducing undesirable emissions in exhaust gases.

These advantages and objects should be apparent from reading this specification while viewing the drawings wherein.

Figure 1:
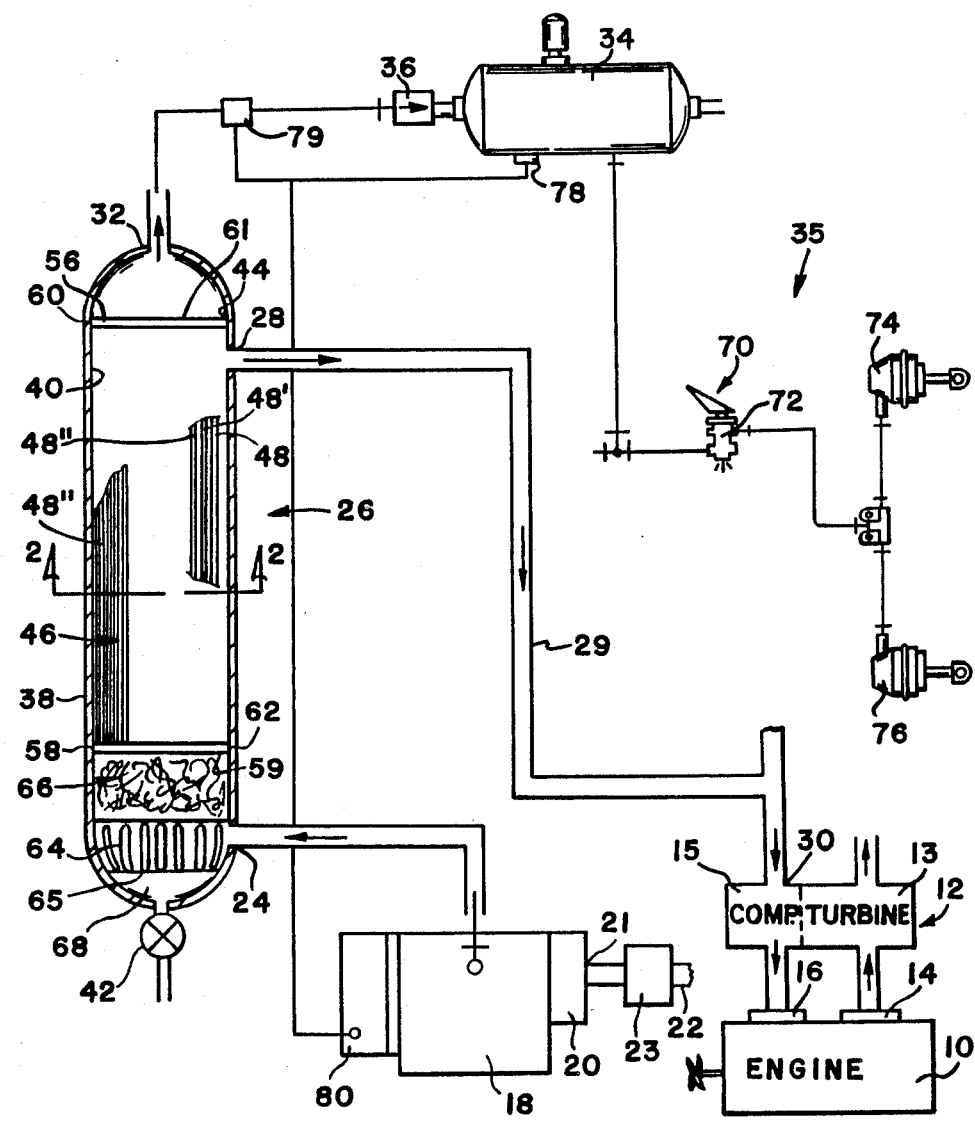
FIG. 1 is a schematic illustration of various components in a vehicle wherein accordance with the principles of the invention, a polymeric fiber membrane separator is connected to provide a turbocharger with moist oxygen enriched air and a storage reservoir with dry nitrogen enriched air for operating a brake system.

A conventional vehicle diesel engine 10 illustrated in FIG. 1 is designed to provide power for a heavy duty truck. The engine 10 is equipped with a diagrammatically illustrated turbocharger 12 which is connected to the exhausted manifold 14 and to the intake manifold 16 of the engine 10. The turbocharger 12, as is well known to those skilled in the art, includes a turbine section 13 which is powered by the exhaust gases from the exhaust manifold 14 operates a compressor section 15 which compresses atmospheric air which charges the intake manifold 16 with compressed air such that the pressure level in the intake manifold 16 is above atmospheric pressure for most conditions of vehicle operation. The engine 10 is drivingly connected with a conventional automotive air compressor 18 which is driven by the engine through, for example, a direct gear drive or a belt drive. The air compressor 18 is provided with pistons (not shown) which compress air which is communicated to the air compressor 18 through the inlet 21 thereof. Inlet 21 is connected by conduit or air line 22 to either the surrounding environment or to the outlet of compressor 15 connected to the inlet manifold 16 of the engine. A filter 23 is located in conduit or air line 22 to remove particles from air that is made available to inlet 21. When inlet 21 is connected to the outlet of compressor 15, a valve mechanism 20 made pursuant to the teachings in U.S. Pat. No. 4,652,216 controls communication between the outlet of compressor 15 and the inlet 21 of the air compressor 18 such that the air undergoing compression in the air commpressor 18 has already been compressed to a pressure level above atmospheric pressure by the turbocharger 15. The outlet of the air compressor 18 is communicated to inlet 24 of a membrane separator 26.

Membrane separator 26 has a first outlet port 28 connected to inlet port 30 of compressor 15 in the turbocharger 12 and a second outlet port 32 connected through one way check valve 36 to a storage reservoir 34 in brake system 35 of the vehicle.

In more particular detail, the membrane separator 26 has a cylindrical housing 38 with cylindrical bore 40. The inlet port 24 and outlet port 28 are located in the side wall of the housing 38 while outlet port 32 is located on one end and drain port 42 is located on the other end. A shoulder 44 located between outlet ports 28 and 32 engages mounting rings 56 on particular fiber membrane 46 made up of a bundle of hollow tubular fiber members 48. On insertion in housing 38 the mounting rings 56 and 58 on fiber membrane 46 engages bore 40 to define annular sealed surfaces 60 and 62 to separate and seal outlet port 28 from inlet port 24 and outlet port 32. Since the membrane separator 26 is uniform and homogenous throughout there is no top or bottom and it can therefore, be inserted into bore 40 without error since permeation takes place through the wall of each hollow tubular fiber members 48, 48′ ... 48$^n$ in the fiber membrane 46.

Figure 2:
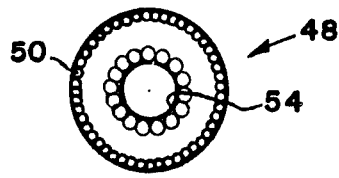
FIG. 2 is an enlarged sectional view along line 2—2 of FIG. 1, of an individual hollow-fiber in the polymeric fiber membrane separator.

An individual fiber member 48 in the membrane separator 46 is illustrated in FIG. 2. Each fiber member 48 is an asymmetric membrane with a differing pore structure with smaller pores 50 on the outer surface and progressively larger pores 52 near the center. A coating 54 is placed on the inner surface of each fiber 48. The individual fiber members 48 are aligned in a parallel manner and a resin applied to the ends thereof. The resin is cured and forms first and second mounting rings 56 and 58. Thereafter, the end is ground or cut such that the ends of the hollow tubular fiber members 48 extend to the face 59 and 61 of the mounting rings 56 and 58. From tests it has been demonstrated that separation of gases in a stream occurs in the following manner:

| $CH_4$ | $N_2$ | CO | $O_2$ | $CO_2$ | He | $H_2$ | $H_2O$ |
|---|---|---|---|---|---|---|---|
| Slow | | | | | Fast | | Very Fast |

Water permeates through the wall of the hollow tubular members about 1000 times faster than air and oxygen permeates through the walls, about twice as fast as nitrogen.

Since it is possible that some air borne or entrained oil may be present in the pressurized air presented to inlet port 24, a first filter 64 is located in bore 40 to engage the pressurized air as it flows from inlet port 24. The first filter 64 has a series of screens that form a tortuous flow path within the bore 40 to separate oil from the pressurized air before it reaches the face 59 of the membrane separator 26. Oil that has been separated from the pressurized air drips down from collectors 65 to a sump section 68. Opening of drain port 42 allows any oil to flow from sump section 68 out of the membrane separator 26. A second filter 66 made of aluminum or glass fiber, is located between filter 64 and the membrane separator 26 to remove finer particulates from the pressurized air and thereby reduce the possibility of contamination of membrane separator 46.

OPERATION OF THE INVENTION

In order for an operator to effect a brake application for a vehicle incorporating the present invention, a force applied to foot pedal 70 operates control valve 72 to allow dry pressurized nitrogen enriched air to flow from storage reservoir 34 to wheel actuators, of which only front wheel actuators 74 and 76 are illustrated in FIG. 1. As long as the fluid pressure in storage reservoir 34 remains above a predetermined level, air compressor 18 is non-operative. Whenever the fluid pressure level in storage reservoir 34 drops to this predetermined level, pressure switch 78 sends a signal to control 80 of the air compressor 18. Control 80 activates compressor 18 by opening valve mechanism 20 to allow air to flow through conduit 22 into air compressor 18. Air compressor 18 raises the fluid pressure to a predetermined level, typically about 120 psig, and supplies the same to inlet port 24 of membrane separator 26. Under circumstances where oil has been entrained in the pressurized air, the first filter 64 retains any large droplets of oil while the second or fine oil filter 66 removes smaller droplets such that only substantially clean pressurized air is presented to face 59 of the fiber membrane 46.

The individual hollow tubular fiber members 48 have a high surface to volume ratio and operate in accordance to the following processes:

(1) dissolution of the gases in the membrane, and the rate of passage is controlled according to Henry's Law:

$$C_i = SC_i \times PP_i$$

where:
  $C_i$ = Concentration of i,
  $SC_i$ = Solubility Constant of i, and
  $PP_i$ = Partial Pressure of i.

(2) porous diffusion in the membrane is controlled by Frick's Law:

$$Q_i = D_i \times C_i / l_i$$

where:
  $Q_i$ = Quantity of i,
  $D_i$ = Diffusivity Coefficient of i, $C_i$ = Concentration of i, and
$l_i$ = Path length of thickness.

The combination of permeation by dissolution and permeation by diffusion is given by a combined expression, known as the Solution-Diffusion Model:

$$Q_i = PC_i/l_i \times A \times PP_i$$

where:
PC$_i$ = Permeation Constant of i,
PP$_i$ = Partial pressure of i, and
A = Area of membrane.

For efficient separation, two elements must be present in a fiber membrane 46: selectively or affinity of the membrane for a particular element(s) and a driving force. The polymeric material of fiber membrane 46 in membrane separator 26 has an affinity for both water and oxygen while the fluid pressure present at face 59 is the driving force. In general, it has been found that 1 square foot of fiber membrane is needed for each SCFM. With a pressure drop across the fiber membrane 46 of about 3-5 psi, water and oxygen permeate through the wall and is presented to outlet port 28 as moist oxygen enriched air. The oxygen enriched air has an oxygen content of about 90% with a fluid pressure of between 3-5 psi. Nitrogen being slow to permeate the walls flow through the hollow tubes 48 and is presented at outlet port 32 as dry nitrogen enriched air having a fluid pressure of about 115-117 psi with a nitrogen concentration of about 95%.

This dry nitrogen enriched air is continually presented through one way check valve 36 to storage reservoir 34 while at the same time, moist oxygen enriched air flows through conduit 29 and is communicated to compressor 15 for transmission to the combustion chamber in engine 10 to enhance the complete combustion of fuel presented to the combustion chamber of engine 10.

When storage reservoir 34 has been pressurized to a predetermined level, switch 78 sends a signal to control 80 to unload compressor 18.

When it is desirable to provide for continued enhancement of the combustion of fuel through the addition of the oxygen enriched air, a valve 79 which is responsive to the signal from switch 78 is opened and the nitrogen enriched air is allowed to flow to the surrounding environment until such time as the pressure level in reservoir 34 again drops to a predetermined level.

Depending on operation conditions, drain port 42 could be manually opened at set intervals as part of general maintenance for the vehicle or if automatic operation is desired the signal that unloads compressor 18 could operate a valve and open drain port 42.

In an effect to evaluate various fiber membranes, a hollow tube polyamide base membrane developed by Bend Research, Inc. of Bend, Oreg. has been considered. This hollow-tube membrane is hydrophilic and does not have an affinity to oil and may be more effective for use in a vehicle for a longer time period with being replaced.

Figure 3:
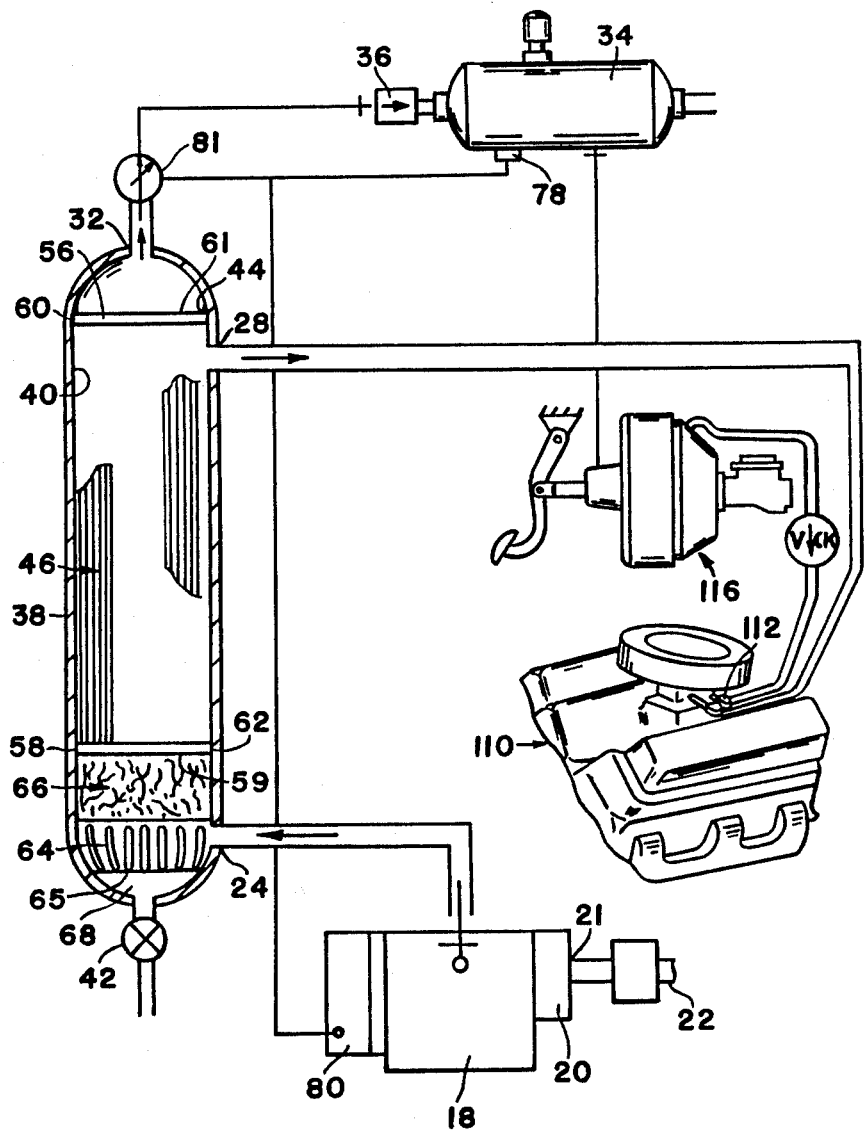
FIG. 3 is a schematic illustration of the membrane separator system of this invention used in combination with an internal combustion engine.

In the embodiment of the invention shown in FIG. 3, an internal combustion engine 110 is equipped with a membrane separator 26 as shown in FIG. 1. Like components used in FIG. 3 have the same identification numbers and perform the same function as in the description of the embodiment in FIG. 1. The outlet port 28 of the membrane separator 26 is connected to the inlet manifold 112 to provide oxygen enriched air to the combustion chamber. The outlet port 32 is connected to reservoir 34 through valve 81 and check valve 36. The reservoir 34 is connected to vacuum brake booster 116. Vacuum brake booster 116 of the type disclosed in U.S. Pat. No. 4,116,218 is designed to normally operate as a result of the pressure differential between air and vacuum however under some circumstances it may be desirable to increase the output potential and as a result pressurized air from reservoir 34 is presented to increase the pressure differential. When continual oxygen enriched air is needed or desired to operate the engine, valve 81 is activated to allow the nitrogen enriched air to flow to the surrounding environment after the fluid pressure in reservoir 34 reaches a predetermined value.

We claim:

1. In a vehicle having a turbocharger for supplying an engine with pressurized air and a storage reservoir for supplying a brake system with pressurized dry nitrogen enriched air through the operation of an air compressor, the improvement comprising:

a housing having a chamber with an inlet port connected to receive pressurized air from said air compressor, a first outlet port connected to said turbocharger and a second outlet port connected to said storage reservoir;

a polymeric fiber membrane located in said chamber, said fiber membrane having a bundle of tubular members, each tubular member having a first end and a second end; and mounting means that engage said housing and the first and second ends of each tubular member in said bundle to define a sealed barrier between said inlet port and first outlet port and said first and second outlet ports, said pressurized air being presented to said inlet port and flowing through said tubular members from said first end toward said second end, said polymeric fiber membrane having an affinity for oxygen and water such that oxygen and water permeate through said polymeric membrane to create moist oxygen enriched pressurized air which flows from said first outlet port while dry nitrogen enriched pressurized air flows from said second end of said tubular members to said second outlet port for distribution to said storage reservoir, said moist oxygen enriched pressurized air being combined with the pressurized air from the turbocharger to enhance combustion of fuel in the engine, said dry nitrogen enriched pressurized air presented to said brake system reducing the possibility of corrosion of the components within the brake system.

2. In the vehicle recited in claim 1, wherein said housing further includes:

a sump section in said chamber adjacent said inlet port, said sump section providing a collection area for any particulates carried by said pressurized air from said compressor; and drain means in said housing through which particulates in said sump section are expelled from said housing.

3. In the vehicle recited in claim 2, wherein said drain means includes:

a valve having a fixed orifice which allows a portion of said pressurized air to continually flow from said chamber and expel particulates from said sump section.

4. In the vehicle recited in claim 3, wherein said housing includes:
a shoulder adjacent said first outlet port for locating said mounting means within said chamber.

5. In the vehicle recited in claim 4, further including; filter means for removal of oil particles from said pressurized air to prevent contamination of said polymeric fiber membrane which could reduce the rate of permeation of oxygen and water toward said first outlet port.

6. In the vehicle recited in claim 5, wherein the flow of pressurized air through said polymeric fiber membrane is continuous until the fluid pressure level in said storage reservoir reaches a predetermined level.

7. In the vehicle recited in claim 5, wherein the flow of pressurized air through said polymeric fiber membrane is continuous to provide moist oxygen enriched air to the combustion chamber while dry nitrogen enriched air is selective presented to the reservoir or the surrounding environment depending on the fluid pressure level in the reservoir.

8. In a vehicle wherein air is supplied to an intake manifold of an engine and a storage reservoir supplies a brake system with pressurized air, the improvement comprising:
a housing having a chamber with an inlet port connected to receive pressurized air from an air compressor, a first outlet port connected to said intake manifold and a second outlet port connected to said storage reservoir;
a polymeric fiber membrane located in said chamber, said fiber membrane having a bundle of tubular members, each tubular member having a first end and a second end; and
mounting means that engage said housing and the first and second ends of each tubular member in said bundle to define a sealed barrier between said inlet port and first and second outlet ports, said pressurized air being presented to said inlet port and flowing through said tubular members from said first end toward said second end, said polymeric fiber membrane having an affinity for oxygen and water such that oxygen and water permeate through said polymeric membrane to create moist oxygen enriched pressurized air which flows from said first outlet port while dry nitrogen enriched pressurized air flows from said second end of said tubular members to said second outlet port for distribution to said storage reservoir, said moist oxygen enriched pressurized air being combined with air in the intake manifold to enhance combustion of fuel in the engine, said dry nitrogen enriched air being presented to said brake system for operating a brake system and reducing the possibility of corrosion of the components within the brake system over an extended period of use.

9. In the vehicle recited in claim 8, wherein said housing further includes:
a sump section in said chamber adjacent said inlet port, said sump section providing a collection area for any particulates carried by said pressurized air from said compressor; and
drain means in said housing through which particulates in said sump section are expelled from said housing.

10. In the vehicle recited in claim 9, wherein said drain means includes:
a valve having a fixed orifice which allows a portion of said pressurized air to continually flow from said chamber and expel particulates from said sump section.

11. In the vehicle recited in claim 10, wherein said housing includes:
a shoulder adjacent said first outlet port for locating said mounting means within said chamber.

12. In the vehicle recited in claim 11, further including:
filter means for removal of oil particles from said pressurized air to prevent contamination of said polymeric fiber membrane which could reduce the rate of permeation of oxygen and water toward said first outlet port.

13. In the vehicle recited in claim 12, wherein the flow of pressurized air through said polymeric fiber membrane is continuous until the fluid pressure level in said storage reservoir reaches a predetermined level.

14. In the vehicle recited in claim 12, wherein the flow of pressurized air through said polymeric fiber membrane is continuous to provide moist oxygen enriched air to the intake manifold while said flow of nitrogen enriched air to the storage reservoir is dependent on the fluid pressure level therein.

15. In the vehicle recited in claim 14, further including:
valve means responsive to the fluid pressure level in the storage reservoir to selective divert the dry nitrogen enriched into the environment to permit said compressor to continually supply said fiber membrane with pressurized air.

* * * * *